United States Patent
Ching

(10) Patent No.: US 7,862,278 B2
(45) Date of Patent: Jan. 4, 2011

(54) ANTI-TAMPER DEVICE

(76) Inventor: Michael Keith Ching, Kalsersthulstrasse 8, 8174 Stadel (CH)

( * ) Notice: Subject to any disclaimer, the term of this patent is extended or adjusted under 35 U.S.C. 154(b) by 605 days.

(21) Appl. No.: 10/572,809

(22) PCT Filed: Sep. 2, 2004

(86) PCT No.: PCT/GB2004/003734

§ 371 (c)(1), (2), (4) Date: Mar. 27, 2006

(87) PCT Pub. No.: WO2005/024254

PCT Pub. Date: Mar. 17, 2005

(65) Prior Publication Data

US 2007/0039140 A1    Feb. 22, 2007

(30) Foreign Application Priority Data

Sep. 2, 2003    (GB) ................................. 0320521.8

(51) Int. Cl.
 *F16B 37/14*    (2006.01)
 *F16B 39/04*    (2006.01)
 *A47G 3/00*    (2006.01)
(52) U.S. Cl. .................... 411/372.6; 411/910; 411/374; 411/208; 411/221; 411/210
(58) Field of Classification Search ............. 411/372.6, 411/910, 374, 208–210, 221
 See application file for complete search history.

(56) References Cited

U.S. PATENT DOCUMENTS 1,105,123 A * 7/1914 Bardwell .................... 411/201
1,261,002 A * 4/1918 Baas .......................... 411/196
3,152,818 A * 10/1964 Ivins .......................... 403/362
4,645,422 A * 2/1987 Brushaber ................. 416/93 A
5,104,274 A * 4/1992 Omori ........................ 411/374
5,205,616 A * 4/1993 Wright .................. 301/37.374
5,214,945 A   6/1993 Martin
5,630,687 A * 5/1997 Robinson ................. 411/372.6
6,053,681 A * 4/2000 Mattershead ................ 411/195

FOREIGN PATENT DOCUMENTS

GB      2239482 A    7/1991

* cited by examiner

*Primary Examiner*—Victor Batson
*Assistant Examiner*—David Reese
(74) *Attorney, Agent, or Firm*—Edwin D. Schindler

(57) ABSTRACT

An apparatus for preventing removal of, or tampering with, a construction fitting includes two construction element engaging components and a fastener for connecting the two construction element engaging components to one another. The fastener includes a bolt extending between the two construction element engaging components and a nut for tightening on the bolt rigidly connecting the two engaging components with a gap therebetween. A body portion, for at least partially covering a nut, prevents access thereto by an unfastening tool with the body portion extending from the nut to a position alongside the bolt within the gap. A locking device is able to be moved relative to the body portion between a first position, in which the apparatus is removable from the construction fitting, and a second position in which the apparatus is prevented from being removed from the construction fitting with the locking device extending, in the second position, from the body portion in a direction toward the bolt with the gap.

16 Claims, 4 Drawing Sheets

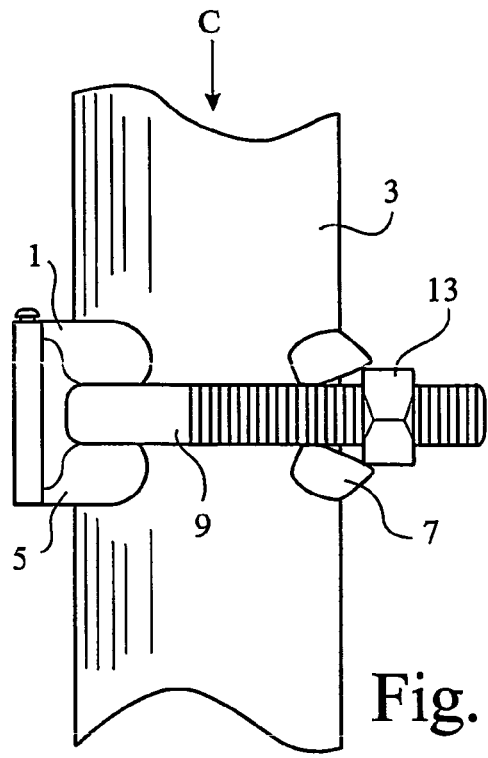
Fig. 1a
Fig. 1b
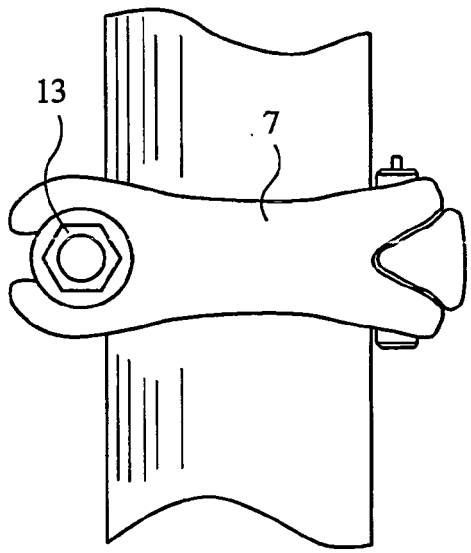
Fig. 1c
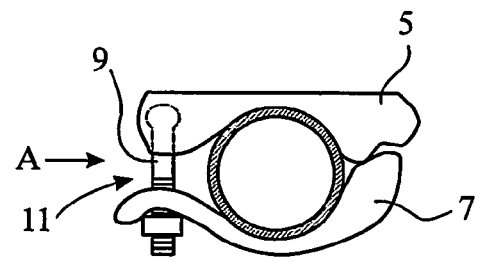
Fig. 1d
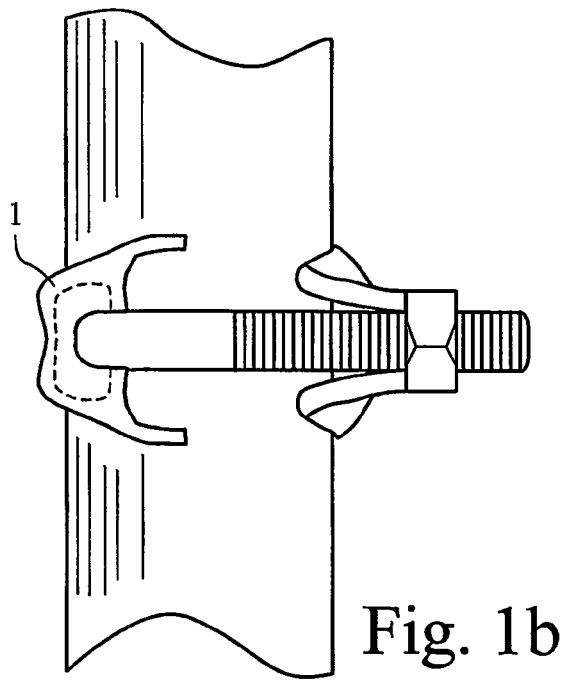
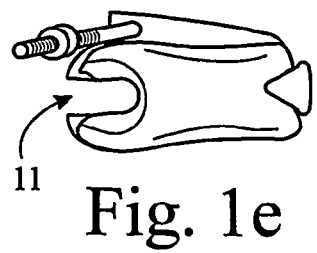
Fig. 1e

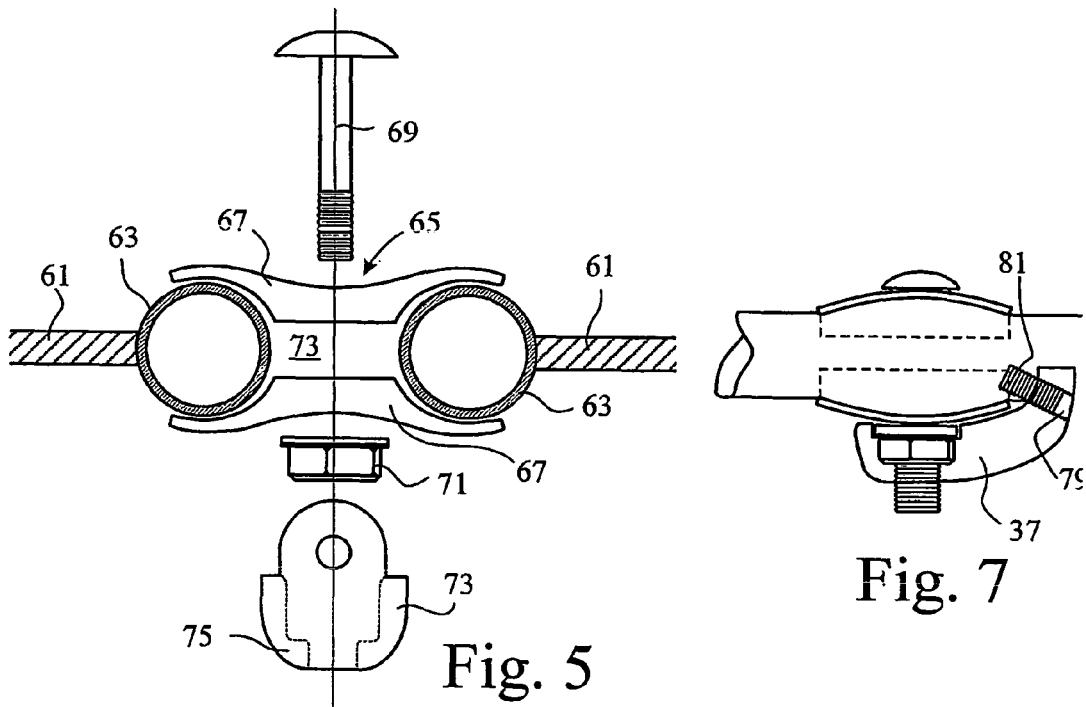
Fig. 5
Fig. 7
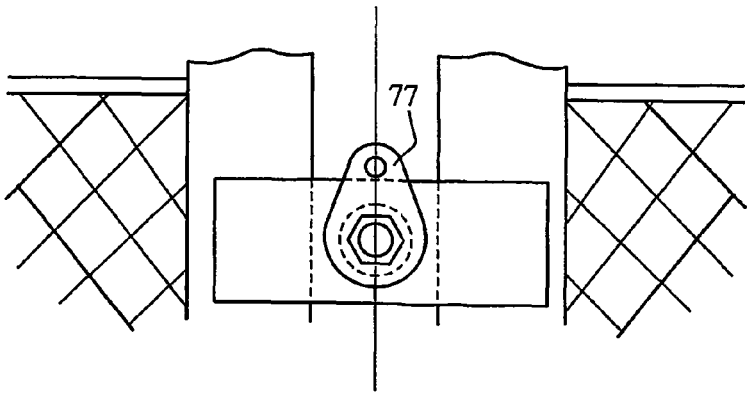
Fig. 6

ANTI-TAMPER DEVICE

FIELD OF THE INVENTION

This invention relates to devices for use in preventing the removal of or tampering with a construction fitting. The term construction fitting, as used herein, means a fitting for location around one or more construction elements for connection purposes. The construction elements are, in particular, rod or pole-like elements which are for connection together or for connection to other items.

BACKGROUND OF THE INVENTION

An example of a construction fitting is a scaffold fitting which has two hinged together components which can be located about a scaffold tube. A bolt is held captive by one of the parts of the fitting and may be manoeuvred into a gate in the other part of the fitting and then held in place by means of a nut, typically a hexagonal shaped nut, for instance a 7/16" or 1/2" Whitworth size nut.

Such nuts can be easily undone by a spanner or wrench which are readily available to any person. Unauthorized removal/tampering with scaffold fittings is a major and hazardous problem in the industry and could have catastrophic results. Scaffolding invariably includes items such as tie members, braces and anchorage points all of which are secured with scaffold fittings (also known as clamps) upon which the security, stability and safety of the scaffolding depends.

A further example of a construction fitting is a clip used to secure temporary fencing commonly used around building sites. This fencing, known as Harris fencing, comprises galvanized steel panels having a tubular frame, the tubes being secured in heavy concrete blocks and secured together with a clamp or parallel coupler comprising two pressed steel pieces interconnected with a nut and bolt fastener.

Such construction fittings are susceptible to removal by undoing the nut thereby releasing the fitting from the construction element(s) to which it is attached.

STATEMENTS OF THE INVENTION

According to the present invention there is provided a device for preventing the removal of or tampering with a construction fitting having two construction element engaging components interconnected by a fastener, said fastener comprising a bolt extending between said components and a nut for tightening on said bolt rigidly to interconnect said components with a gap therebetween, said device comprising a body portion for at least partly covering said nut, preventing access thereto by an unfastening tool, said body portion then extending from said nut to a position alongside said bolt within said gap, said device further including locking means movable relative to the body portion between a first position in which the device may be removed from the fitting and a second position when such removal is prevented, said locking means extending, in its second position from said body portion in a direction towards said bolt with said gap.

Preferably said locking means is movable within a bore provided in said body portion. The locking means may be, for example, a screw-threaded element or a pin lockable to the body portion in its second position.

Preferably the locking means is arranged so that access thereto to effect said movement requires a suitably sized and shaped tool.

Preferably said locking means and said tool are provided with respective key and keyhole elements which must be engaged in order to move said locking means from the second to the first position.

Preferably the body portion surrounds, in use, essentially all of the otherwise exposed surfaces of the nut of the fitting, said body portion including a bore through which the free end of the bolt extends.

Preferably the body portion and locking means are made of metal.

Examples of construction fittings to which the device of the invention may be applied are scaffold fittings and fittings forming part of temporary fencing.

BRIEF DESCRIPTION OF THE DRAWINGS

The accompanying drawings are as follows:

FIG. 1A is a side view of a scaffold fitting secured to a scaffold tube;

FIG. 1B is a similar view on another type of scaffold fitting;

FIG. 1C is a view on arrow B of FIG. 1B;

FIG. 1D is a top plan view of the fitting and tube of FIG. 1C;

FIG. 1E shows the fitting of FIG. 1A without the tube and without the bolt located in place;

FIG. 5 shows a further embodiment of a device in accordance with the present invention and being used in connection with temporary fencing;

FIG. 6 is a front view of the device of FIG. 5 and showing the device in position; and FIG. 7 is a top view of the arrangement shown in FIG. 6.

DETAILED DESCRIPTION OF THE INVENTION

Figure 2A:
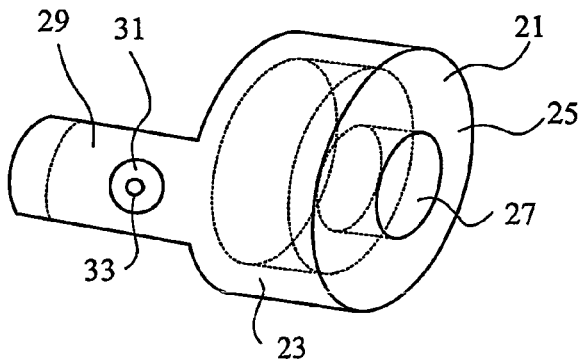
FIG. 2A is a first perspective view of a device in accordance to the present invention.

The invention will now be described, by way of examples only, and with reference to the accompanying drawings.

Referring to FIGS. 1A to 1E, a scaffold fitting 1, which may be in the form, for instance, of that shown in FIG. 1A or FIG. 1B, is shown secured to a scaffold tube 3. The fitting includes hinged together components 5 and 7 and a bolt 9, the head of which is held captive in component 5 and the free end of which may be positioned between the bifurcated arms of components 7 which form the gate 11. When so positioned, a hexagonal nut 13 may be screwed in the direction towards the head of bolt 9 until it is tight against component 7 thereby holding the fitting firmly in page on tube 3.

It will be appreciated that the above described fitting can be easily loosened or removed from tube 3 simply by applying an appropriate tool, such as a spanner, to the hexagonal nut 3.

Figure 2B:
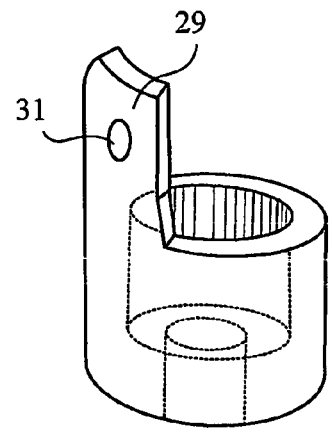
FIG. 2B is a second perspective view of the device of FIG. 2A.
Figure 2C:
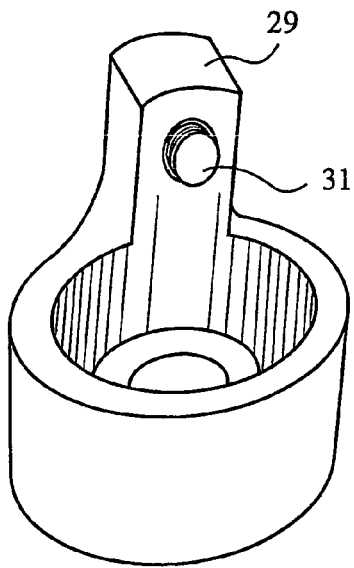
FIG. 2C is a third perspective view of the device of FIG. 2A.

Referring to FIGS. 2A to 2C, device in accordance with the present invention is a single part construction, normally made of hard metal (or any other hard material) which has two functional components. The first component is a domed head member 21 in which a short, hollow cylindrical section 23 is provided at one end with an integral curved cap 25 having a central bore 27 extending therethrough into communication with the hollow interior of cylindrical section 23.

Extending from cylindrical section 23 is a longitudinally extending leg or wing 29 which is provided with a radial screw threaded bore 31. Located within bore 31 is a grub screw 33 having an outer end provided with a specially shaped "keyhole" such as one of those illustrated in FIG. 4. A corresponding tool (not shown) is required with a "key" shape to correspond to the keyhole configuration of grub screw 33.

Figure 3A:
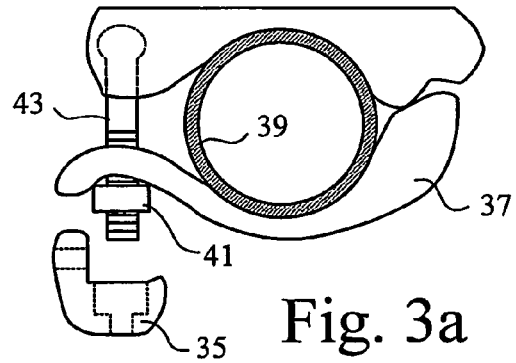
FIG. 3A shows the device of FIG. 2A being moved into position relative to a scaffold fitting.
Figure 3B:
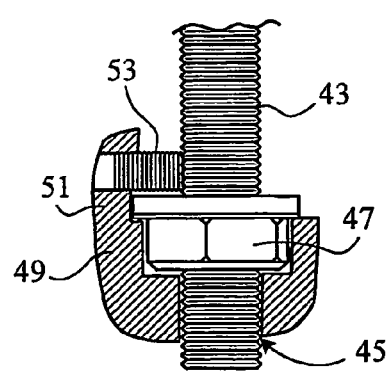
FIG. 3B shows the device of FIG. 2A located in position on a scaffold fitting.
Figure 3C:
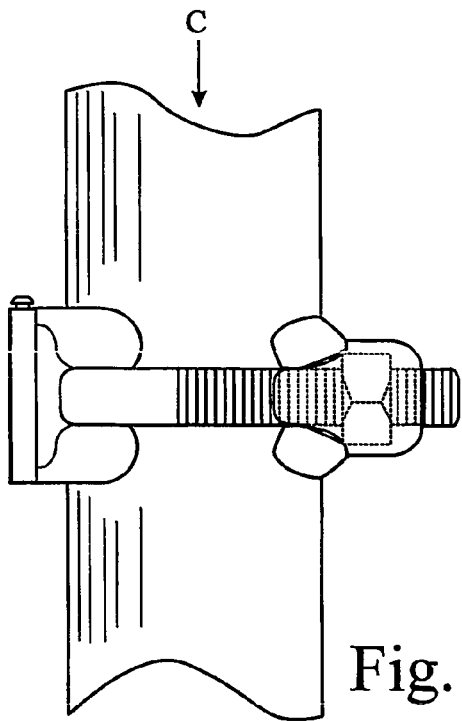
FIG. 3C is a further view of the device of FIG. 2A located in position relative to a scaffold fitting.
Figure 3E:
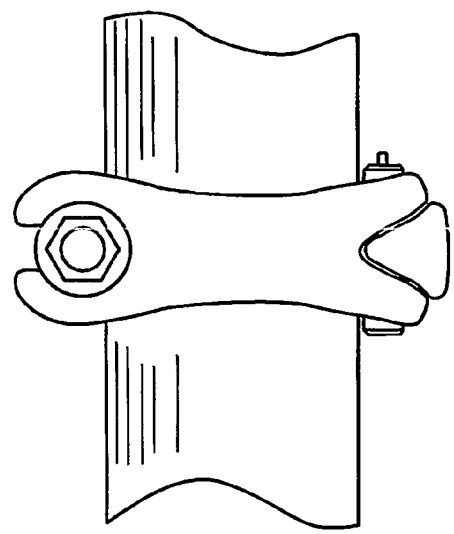
FIG. 3E is a further view of the fitting of FIG. 3D along the view line B of FIG. 3D.
Figure 3D:
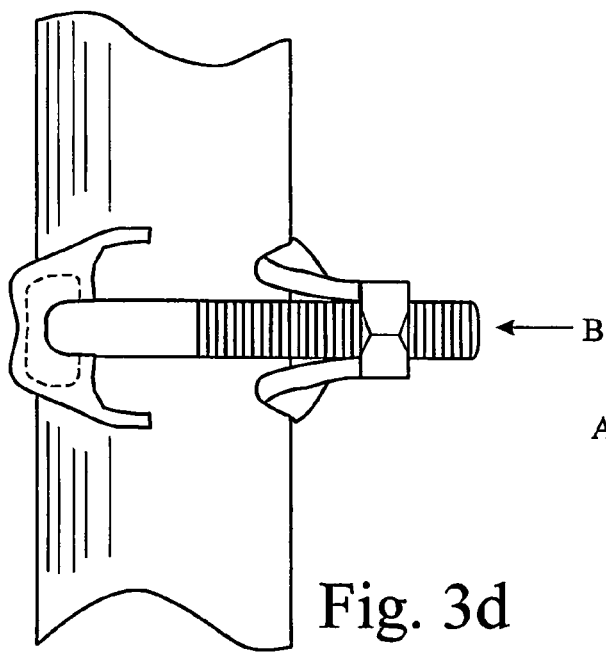
FIG. 3D is an alternative, preferred embodiment of the scaffold fitting of FIGS. 3A to 3C.

Referring to FIGS. 3A and 3B of the accompanying drawings, a device 35 in accordance with the present invention is applied to a scaffold fitting 37 which in turn is located around scaffold tube 39. In order to apply device 35, it is slid over nut 41 by moving it relative to fitting 37 as indicated by the arrow in FIG. 3A. This movement is continued until the free end of bolt 43 is positioned as shown in FIG. 3B extending through bore 45 of the device and with the hexagonal nut 47 located within the relatively enlarged space defined by cylindrical section 49 of the device. With the device in this position the wing 51 extends across the end of part 37 of the scaffold fitting (not shown in FIG. 3B). Applying the special tool to the outer end of grub screw 53 enables this screw to be moved into engagement with bolt 43, as indicated in FIG. 3B. When grub screw 53 is tightened against bolt 43, the device cannot be removed and the hexagonal nut 47 is no longer accessible, thereby preventing any unauthorized tampering.

Referring to FIGS. 5 to 7 of the accompanying drawings, a further embodiment of the device in accordance with the present invention is for use in connection with temporary fencing, known as Harris fencing. This fencing includes galvanized steel panels (61) having tubular side-frame members 63 which may be interconnected by means of a clamp or parallel coupler 65. Clamp 65 comprises two pressed steel members 67 interconnected by means of a bolt 69 and a nut 71. When securely in place there is a gap 73 between the elements 67.

The second embodiment of the device of the present invention includes a body portion 73 having a first part 75 for location over nut 71 and a second part, extending from first part 75 and provided with a screw-threaded bore 79. Thus, the device 73 is broadly similar to that described above with reference to FIGS. 2 and 3.

Figure 4:
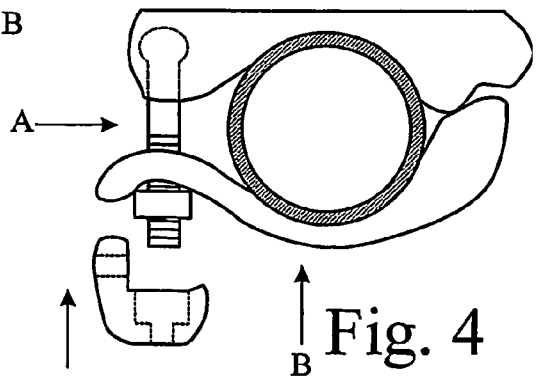
FIG. 4 shows examples of designs of the heads of tools for use with a device of the invention.

The device includes a grub screw 81 having an outer end provided with a specially shaped "keyhole" such as one of those illustrated in FIG. 4. A corresponding tool (not shown), provided with a corresponding "key" shape, is used to engage the grub screw 81 and effect movement thereof within bore 79.

In use the device of the invention is positioned as indicated in FIGS. 6 and 7 with portion 75 surrounding nut 71 and portion 77 extending over or under member 67 to a position whereby bore 79 is adjacent the shank of bolt 69 within gap 73. In this position the grub screw may then be turned, using the appropriate tool, until it engages the shank of bolt 69. In this position the device of the invention cannot be removed since the nut 71 is not accessible to an unfastening tool.

It should be appreciated that the threaded bore and grub screw arrangements described above may be replaced by a locking pin movable within a bore in the body portion of the device and operated by key between a locking and an unlocking position.

As indicated above, a device in accordance with the present invention may be made from a hard metal, examples being steel, tool steel, stainless steel or indeed any other appropriate material.

A device in accordance to the present invention can be made clearly visible and it may, for instance, be brightly coloured and/or coated with a reflective material. Visibility is particularly important when there is a "duty of care" to ensure that unauthorized or forced removal will be readily noticed by a safety officer or any other appropriate person.

The invention claimed is:

1. An apparatus for preventing removal of, or tampering with, a construction fitting, comprising:
    a body portion;
    a fastener for connecting two construction element engaging components to one another, said fastener comprising a bolt extending between said two construction element engaging components and a nut for tightening on said bolt rigidly connecting said two construction element engaging components with a gap therebetween, said nut having a first side facing away from said body portion when said fastener is fitted for connecting said two construction element engaging components to one another and a second side of said nut opposed to said first side;
    said body portion at least partially covering said nut for preventing access thereto by an unfastening tool and extending from said nut to a position alongside said bolt within said gap; and,
    locking means movable relative to said body portion between a first position, wherein said apparatus is removable from said construction fitting, and a second position wherein said apparatus is prevented from being removed from said construction fitting, said locking means extending, in said second position, from said body portion in a direction toward said bolt with said gap, said second side of said nut being received in said body portion with said locking means being located beyond said first side of said nut, and not between said first side and said second side of said nut, for rendering said nut inaccessible and thereby preventing removal of, or tampering with, a construction fitting when locked.

2. The apparatus for preventing removal of, or tampering with, a construction fitting according to claim 1, wherein said locking means is movable within a bore in said body portion.

3. The apparatus for preventing removal of, or tampering with, a construction fitting according to claim 1, wherein said locking means is a screw-threaded element.

4. The apparatus for preventing removal of, or tampering with, a construction fitting according to claim 1, wherein said locking means is a pin lockable to said body portion in said second position.

5. The apparatus for preventing removal of, or tampering with, a construction fitting according to claim 1, wherein said locking means is accessible, and movement is effected, via a shaped tool.

6. The apparatus for preventing removal of, or tampering with, a construction fitting according to claim 5, wherein said locking means and said shaped tool have respective key and keyhole elements engagable for moving said locking means from said second position to said first position.

7. The apparatus for preventing removal of, or tampering with, a construction fitting according to claim 1, wherein said body portion surrounds, in use, substantially all otherwise exposed surfaces of said nut of said construction fitting, said body portion including a bore through which a free end of said bolt extends.

8. The apparatus for preventing removal of, or tampering with, a construction fitting according to claim 1, wherein said body portion and said locking means are made of metal.

9. An apparatus for preventing removal of, or tampering with, a construction fitting, comprising:
- a body portion;
- a fastener for connecting two construction element engaging components to one another, said fastener comprising a bolt extending between said two construction element engaging components and a nut for tightening on said bolt rigidly connecting said two construction element engaging components with a gap therebetween, said nut having a first side facing away from said body portion when said fastener is fitted for connecting said two construction element engaging components to one another and a second side of said nut opposed to said first side;
- said body portion at least partially covering said nut for preventing access thereto by an unfastening tool and extending from said nut to a position alongside said bolt within said gap; and,
- locking means comprising a grub screw that engages and tightens against said bolt, said locking being movable relative to said body portion between a first position, wherein said apparatus is removable from said construction fitting, and a second position wherein said apparatus is prevented from being removed from said construction fitting, said locking means extending, in said second position, from said body portion in a direction toward said bolt with said gap, said second side of said nut being received in said body portion with said locking means being located beyond said first side of said nut, and not between said first side and said second side of said nut, for rendering said nut inaccessible when said grub screw is tightened against said bolt, thereby preventing removal of, or tampering with, a construction fitting when locked.

10. The apparatus for preventing removal of, or tampering with, a construction fitting according to claim 9, wherein said locking means is movable within a bore in said body portion.

11. The apparatus for preventing removal of, or tampering with, a construction fitting according to claim 9, wherein said locking means is a screw-threaded element.

12. The apparatus for preventing removal of, or tampering with, a construction fitting according to claim 9, wherein said locking means is a pin lockable to said body portion in said second position.

13. The apparatus for preventing removal of, or tampering with, a construction fitting according to claim 9, wherein said locking means is accessible, and movement is effected, via a shaped tool.

14. The apparatus for preventing removal of, or tampering with, a construction fitting according to claim 9, wherein said locking means and said shaped tool have respective key and keyhole elements engagable for moving said locking means from said second position to said first position.

15. The apparatus for preventing removal of, or tampering with, a construction fitting according to claim 9, wherein said body portion surrounds, in use, substantially all otherwise exposed surfaces of said nut of said construction fitting, said body portion including a bore through which a free end of said bolt extends.

16. The apparatus for preventing removal of, or tampering with, a construction fitting according to claim 9, wherein said body portion and said locking means are made of metal.

* * * * *